United States Patent
Xu et al.

(10) Patent No.: US 12,233,482 B2
(45) Date of Patent: Feb. 25, 2025

(54) INTELLIGENT ELECTROMAGNETIC INDUCTION HEATING LEVELING SYSTEM AND METHOD THEREOF

(71) Applicant: JIANGSU UNIVERSITY OF SCIENCE AND TECHNOLOGY, Jiangsu (CN)

(72) Inventors: Jing Xu, Jiangsu (CN); Xiaonan Chang, Jiangsu (CN); Jiayang Gu, Jiangsu (CN); Yefan Wang, Jiangsu (CN); Bingwu Gao, Jiangsu (CN); Shengrong Li, Jiangsu (CN); Zixi He, Jiangsu (CN); Qiuyan Wang, Jiangsu (CN); Changwen Yang, Jiangsu (CN); Xinyang Sun, Jiangsu (CN)

(73) Assignee: JIANGSU UNIVERSITY OF SCIENCE AND TECHNOLOGY, Jiangsu (CN)

( * ) Notice: Subject to any disclaimer, the term of this patent is extended or adjusted under 35 U.S.C. 154(b) by 0 days.

(21) Appl. No.: 18/703,723

(22) PCT Filed: Nov. 24, 2022

(86) PCT No.: PCT/CN2022/134062
§ 371 (c)(1),
(2) Date: Apr. 23, 2024

(87) PCT Pub. No.: WO2023/155525
PCT Pub. Date: Aug. 24, 2023

(65) Prior Publication Data
US 2024/0408702 A1    Dec. 12, 2024

(30) Foreign Application Priority Data
Feb. 16, 2022   (CN) .......................... 202210139640.5

(51) Int. Cl.
  *B23K 31/00*   (2006.01)
  *B21D 1/06*    (2006.01)
  *B21D 37/16*   (2006.01)

(52) U.S. Cl.
  CPC .............. *B23K 31/003* (2013.01); *B21D 1/06* (2013.01); *B21D 37/16* (2013.01)

(58) Field of Classification Search
  CPC ...... B23K 31/003; B23K 31/125; B21D 1/06; B21D 37/16
  (Continued)

(56) References Cited

U.S. PATENT DOCUMENTS

| 2020/0338614 A1 | 10/2020 | Park et al. | |
| 2022/0032396 A1* | 2/2022 | Ivkovich | B23K 31/125 |
| 2022/0032397 A1* | 2/2022 | Ivkovich | G06T 7/0008 |

FOREIGN PATENT DOCUMENTS

| CN | 112475541 A * | 3/2021 | ............ B23K 9/095 |
| CN | 112730077 | 4/2021 | |

(Continued)

OTHER PUBLICATIONS

"International Search Report (Form PCT/ISA/210) of PCT/CN2022/134062", mailed on Feb. 23, 2023, with English translation thereof, pp. 1-4.

(Continued)

*Primary Examiner* — Jeffrey T Carley
*Assistant Examiner* — Alba T Rosario-Aponte
(74) *Attorney, Agent, or Firm* — JCIPRNET (57) ABSTRACT

An intelligent electromagnetic induction heating leveling system, comprising: a trolley type leveler, an unmanned aerial vehicle temperature measurement device, indoor positioning devices used for converting position information of a trolley of the trolley type leveler and the unmanned aerial vehicle temperature measurement device into position (Continued)

parameters, and a control system. The system can perform, according to preset data parameters, data transmission by means of a wireless local area network and the unmanned aerial vehicle temperature measurement device and control the unmanned aerial vehicle temperature measurement device to move to a specified position. The system intelligently controls the leveling temperature and leveling time of a leveling area, and thus may be suitable for leveling of weld joints having different sizes and depths, and achieve a good leveling effect. Also provided is an intelligent electromagnetic induction heating leveling method.

5 Claims, 4 Drawing Sheets

(58) Field of Classification Search
USPC .................................. 219/653, 600, 647, 617
See application file for complete search history.

(56) References Cited

FOREIGN PATENT DOCUMENTS

| | | | | |
|---|---|---|---|---|
| CN | 112742980 | | 5/2021 | |
| CN | 112742980 A | * | 5/2021 | ............ B21C 51/00 |
| CN | 113145687 | | 7/2021 | |
| CN | 113351685 | | 9/2021 | |
| CN | 114700427 | | 7/2022 | |
| EP | 3785839 A1 | * | 3/2021 | ............ B23K 37/00 |
| KR | 20210065677 A | * | 6/2021 | |

OTHER PUBLICATIONS

"Written Opinion of the International Searching Authority (Form PCT/ISA/237) of PCT/CN2022/134062", mailed on Feb. 23, 2023, with English translation thereof, pp. 1-9.

* cited by examiner

INTELLIGENT ELECTROMAGNETIC INDUCTION HEATING LEVELING SYSTEM AND METHOD THEREOF

CROSS-REFERENCE TO RELATED APPLICATION

This application is a 371 of international application of PCT application serial no. PCT/CN2022/134062, filed on Nov. 24, 2022, which claims the priority benefit of China application no. 202210139640.5, filed on Feb. 16, 2022. The entirety of each of the above mentioned patent applications is hereby incorporated by reference herein and made a part of this specification.

TECHNICAL FIELD

The present disclosure belongs to the technical field of the leveling for the welding deformation, and specifically relates to an intelligent electromagnetic induction heating leveling system and a method thereof.

BACKGROUND

During the construction of the large ships, it is currently necessary to use a leveler to level the welds between the connecting steel plates. The steel plate proximity to the weld is heated by the leveler to a specified temperature to achieve the goal of eliminating the internal stress proximity to the weld, and to flat the weld. During the process of leveling the weld, it is impossible to directly measure the temperature on the upper surface of the steel plate due to the obstruction of the leveler, and the temperature of the leveler is relatively high during operation, it is inconvenient to install the temperature measurement device in the operation position of the leveler. Therefore, in an actual operation, the time for leveling welds is depended on the experience of the workers, so that the situations that the temperature is too high or cannot meet the requirement are existed.

An intelligent mobile electromagnetic induction leveling device and a method thereof are disclosed in Chinese patent application (202110031588.7). The device includes a device main body and a wireless remote controller. The device main body includes a hollow frame, a chassis, an induction heating mechanism arranged at the intermediate of the hollow frame, and an intelligent leveling mechanism fixed under the induction heating mechanism. An induced current eddy current is generated inside the heated workpiece by the induction heating mechanism through the electromagnetic induction for heating. The induction heating mechanism includes a controller, a variable frequency and variable voltage power supply, a coaxial transformer, and an electromagnetic induction heating coil that are arranged on the upper surface of the chassis from left to right in sequence. The intelligent leveling mechanism is configured to level the workpiece, including a vacuum suction cup, a laser sensor, an infrared temperature sensor, a poly magnet, a servo motor, wheels and devices that are installed on the back surface of the chassis from left to right in sequence and a DTOF sensor installed on right front side of the device main body. The device is designed with consideration of the problem of the temperature measurement in the leveling area. However, the infrared temperature sensor is installed on the induction coil, which affects the surface flatness of the induction coil and the leveling effect.

SUMMARY

The objectives of the present disclosure are to eliminate the existing technical defects. An intelligent electromagnetic induction heating leveling system and a method thereof are provided. In the present disclosure, the temperature in the leveling area can be accurately measured, the leveling temperature and the leveling time of the leveler are controlled, and the leveling effect of the leveler is improved.

In order to solve the above technical problems, the following technical solutions are adopted in the present disclosure.

An intelligent electromagnetic induction heating leveling system is disclosed in the present disclosure. The system includes as follows.

A trolley-type lever includes a main body of the trolley-type leveler. A first positioning tag and a main control device are arranged on the trolley-type leveler. The first positioning tag is configured to measure position parameters for the trolley-type leveler, and the main control device is configured to control a moving position, an operation state and a data interaction of an unmamed aerial vehicle (UAV) temperature measurement device.

The UAV temperature measurement device includes a quad-rotor unmamed aerial vehicle (UAV), a temperature measurement module, a control chip, and a second positioning tag. An instruction from a control system is accepted by the control chip (8) to control the quad-rotor UAV to move to a position under an operation area of the trolley-type leveler, and to control the measurement module to measure a temperature in the operation area, and the second positioning tag is configured to detect a position of the UAV temperature measurement device to enable the UAV temperature measurement device to reach a designated position.

An indoor positioning device includes two sets of ultra wide band (UWB) indoor positioning devices, respectively including a positioning tag, positioning base stations. The two sets of the UWB indoor positioning devices are respectively configured to convert position information of the trolley-type leveler and the UAV temperature measurement device into position parameters. The positioning base stations are arranged around operation areas of the trolley-type leveler and the UAV temperature measurement device, and cover a signal in the operation areas, and are configured to detect the position information of the trolley-type leveler and the UAV temperature measurement device and upload the information to the control system for a summary analysis.

The control system includes the main control device installed on the trolley-type leveler. The control system is configured to intelligently control a leveling time and a leveling temperature in a leveling area are, and display the temperature in the leveling area through a display screen; to transmit data through a wireless local area network and the UAV temperature measurement device, and control the UAV temperature measurement device to move to the designated position, to complete a leveling operation efficiently.

The first positioning tag is arranged on a handle of the trolley-type leveler.

The second positioning tag is arranged on a base of the quad-rotor UAV.

A two-dimensional positioning is adopted in the UWB indoor positioning device applied to the trolley leveler. At least four positioning base stations are arranged in the UWB indoor positioning device, and the at least four position base stations are respectively installed in an edge area where the trolley-type leveler is operated.

A three-dimensional positioning is adopted in the UWB indoor positioning device applied to the quad-rotor UAV temperature measurement device. At least four positioning base stations are arranged in the UWB indoor positioning device, and the at least four positioning base stations are respectively installed in an edge area where the quad-rotor UAV temperature measurement device is operated.

Further provided in the present disclosure is an intelligent electromagnetic induction heating leveling method. An intelligent electromagnetic induction heating leveling system is adopted in the intelligent electromagnetic induction heating leveling method. The intelligent electromagnetic induction heating leveling system includes a trolley-type leveler, an UAV temperature measurement device and a control system. and the intelligent electromagnetic induction heating leveling system is set as that the trolley-type leveler is set to move and operate along a Y-axis direction, a distance from the first positioning tag on the trolley-type leveler to a leveling area along the Y-axis direction is set to d mm, the temperature required in the leveling area is set at T ° C., and the temperature required in the leveling area is required to be maintained for t seconds. The method includes the following steps.

In Step 1, the UWB positioning base stations are arranged around operation areas of the trolley-type leveler and the UAV temperature measurement device, and the first positioning tag and a second positioning tag are respectively placed on a handle of the trolley-type leveler and a base of the quad-rotor UAV of the UAV temperature measurement device.

In Step 2, the trolley-type leveler is moved to an operation position.

In Step 3, an activation button on a main control device is pressed to activate an ultra wide band (UWB) indoor positioning device, a signal sent by the first positioning tag on the trolley-type leveler is received by the positioning base station to convert the signal into the position parameters and transmit to the control system.

In Step 4, a distance of d mm from the handle to the leveling area is increased by the control system on the basis of the received position parameters, and converted into position parameters for the leveling area automatically, and the UAV temperature measurement device is controlled to move to a position under the leveling area through the control chip.

In Step 5, the UAV temperature measurement device is assisted by the control system to reach a designated position through the UWB indoor positioning device, and when the UAV temperature measurement device is reached the designated position, the trolley-type leveler being in an operation state is displayed on the display screen.

In Step 6, the trolley-type leveler is started for operation, and at a same time, a temperature in the leveling area is started to be measured by the temperature module of the UAV temperature measurement device, and the temperature information in a detection area is sent to the leveling system through the control chip, and is displayed in real time through the display screen on the main control device.

In Step 7, when the temperature in the detection area is reached the required temperature T ° C., a power of the trolley-type leveler is controlled by the control system automatically, and the temperature in the leveling area is stabilized at T ° C. and maintained for t seconds.

In Step 8, the trolley-type leveler is terminated for operation after t seconds, the UAV temperature measurement device is maintained under the leveling area, and the temperature module of the UAV temperature measurement device is closed.

Step 9, since the trolley-type leveler is currently required to be moved to another operation area in an actual operation, a synchronization button is pressed to automatically repeat Steps 3 to 8, thereby implementing a synchronous movement for the trolley-type leveler and the UAV temperature measurement device.

In Step 10, when the leveling operation in the leveling area is completed, the button is pressed to enable the UAV temperature measurement device to fly back to an initial position.

Compared with the prior art, the present disclosure has the following advantages and the beneficial effects.

1. The intelligent electromagnetic induction heating leveling system in the present disclosure can intelligently control the leveling temperature and the leveling time in the leveling area according to the preset data parameters, and can be applied to the leveling for the welds of different sizes and depths, thereby improving the leveling effect.
2. The ultra wide band (UWB) indoor positioning device is adopted in the present disclosure, and the temperature in the leveling area is accurately measured from the position under the leveling area through the relevant calculation of the control system, thereby avoiding the trouble of making the structure more complicated by the direct measurement, and improving the leveling effect.
3. In the UAV temperature measurement device of the present disclosure, the control chip is adopted to control the temperature measurement module and the quad-rotor UAV, and can transmit the information through the wireless local area network and the control system, thereby enabling the control to be more rapid, accurate and stable.

DETAILED DESCRIPTION OF THE EMBODIMENTS

The present disclosure will be further described with reference to the accompanying drawings in the followings.

Figure 1:
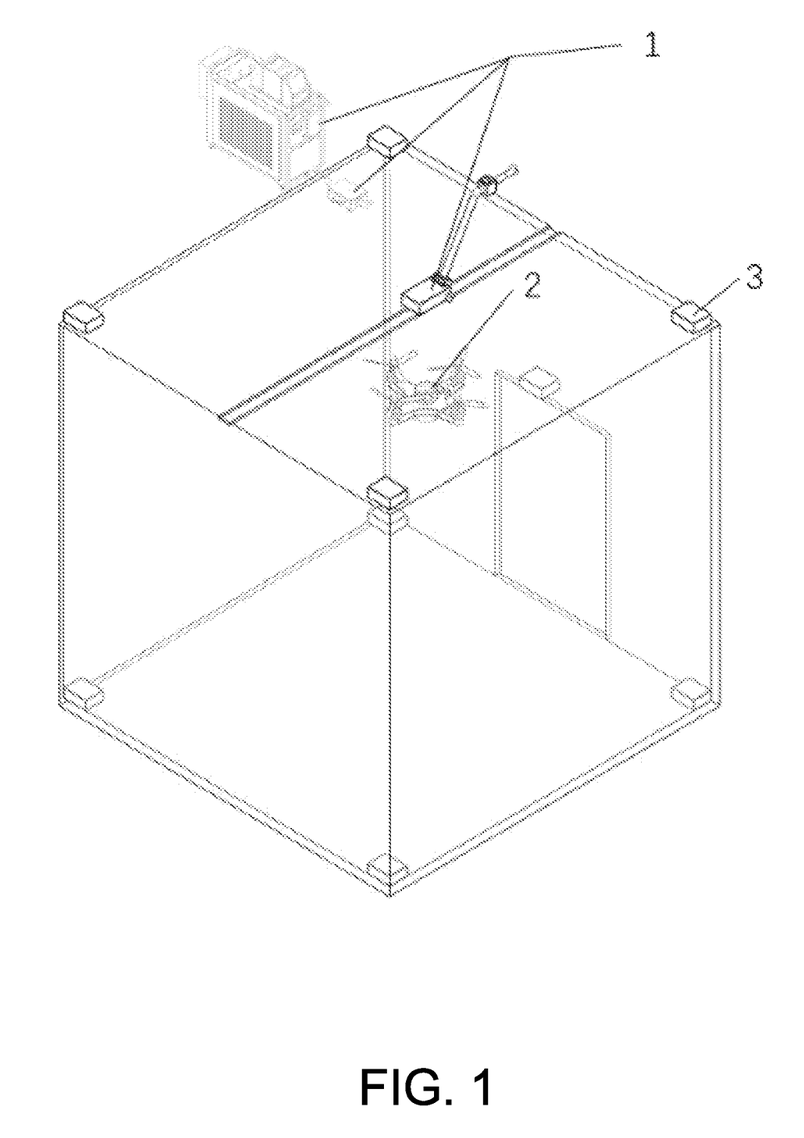
FIG. 1 illustrates a schematic diagram of an overall structure of an intelligent electromagnetic induction heating leveling system in the present disclosure.

As illustrated in FIG. 1, an intelligent electromagnetic induction heating leveling system is provided in the present disclosure. The system includes a trolley-type leveler 1, an ultra wide band (UWB) indoor positioning device, an UAV temperature measurement device 2, and a control system.

Figure 2:
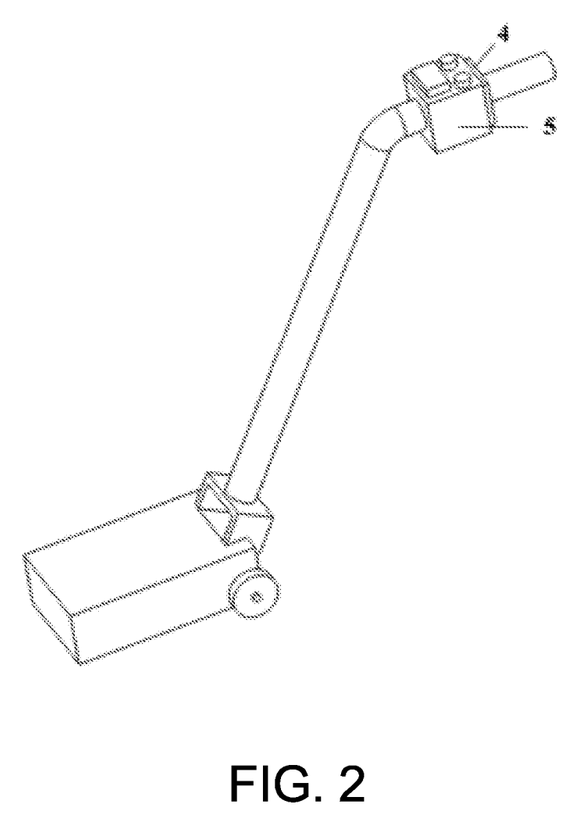
FIG. 2 illustrates a schematic diagram of a partial structure of a trolley-type leveler of the intelligent electromagnetic induction heating leveling system in the present disclosure.

As illustrated in FIG. 2, the trolley-type leveler 1 of the intelligent electromagnetic induction heating leveling system is provided in the present disclosure. The trolley-type leveler 1 of the system includes a main body of the trolley-type leveler 1. A first positioning tag 4 and a main control device 5 are arranged on the trolley-type leveler 1. The first positioning tag 4 is mainly configured to measure the position parameters for the trolley-type leveler 1, and the main control device 5 is configured to control a moving position, an operation state and a data interaction of the UAV temperature measurement device 2. Since the first positioning tag 4 is installed on a handle of the trolley-type leveler 1, a distance from the handle position to the operation area is required to be added when the position of the operation area of the trolley-type leveler 1 is determined, so that the position parameters for the leveling area is obtained.

The UWB indoor positioning device includes a positioning tag and positioning base stations 3, and is configured to convert the position information of the trolley-type leveler 1 and the UAV temperature measurement device 2 into the position parameters. In the present disclosure, two sets of UWB indoor positioning devices are provided, which are respectively configured to measure the position parameters for the trolley-type leveler 1 and the UAV temperature measurement device 2, where the two-dimensional positioning is adopted in one set of the UWB indoor positioning devices configured to position the trolley-type leveler 1, and more than three positioning base stations 3 are adopted in the UWB indoor positioning device, which are installed in the edge area where the trolley-type leveler 1 is operated, and the first positioning tag 4 is installed on the trolley-type leveler 1. The three-dimensional positioning is adopted in the other set of the UWB indoor positioning devices, and is configured to position the UAV temperature measurement device 2, the positioning base stations 3 are installed in the edge area where the UAV temperature measurement device 2 is operated. The second positioning tag 9 is installed on the base of the quad-rotor UAV 6. The main function of the base stations 3 is to measure the position data for the positioning tag and upload the position data to the control system. More than three base stations 3 are required to be installed on each set of the positioning devices. The more positioning base stations 3 are arranged, the better the positioning effect is achieved. The positioning base stations 3 are respectively installed around the operation areas of the trolley-type leveler 1 and the UAV temperature measurement device 2, and the positioning base stations 3 can accept the signal sent by the positioning tags to convert the signal into the position data and upload to the control system through the wireless network system.

Figure 3:
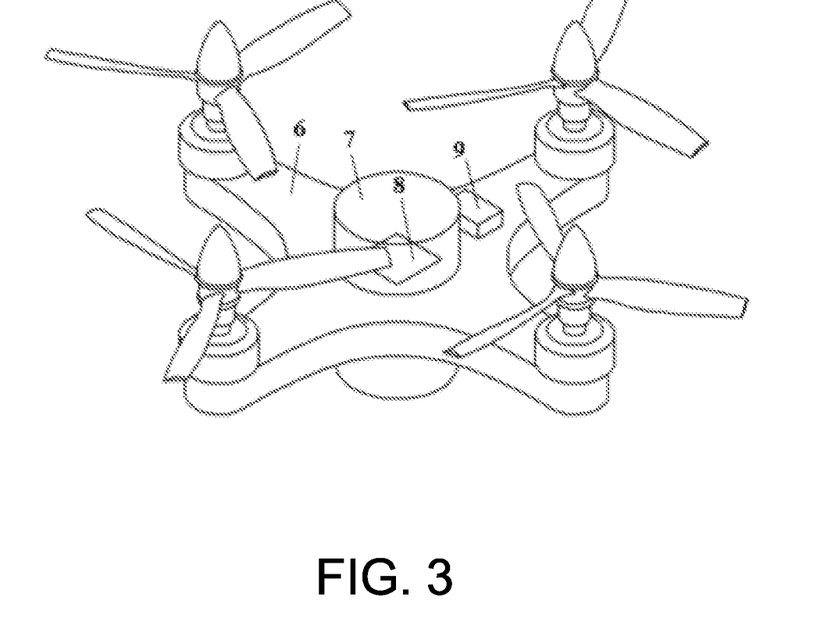
FIG. 3 illustrates a schematic diagram of a structure of an unmanned aerial vehicle temperature measurement device of the intelligent electromagnetic induction heating leveling system in the present disclosure.

As illustrated in FIG. 3, the UAV temperature measurement device 2 of the intelligent electromagnetic induction heating leveling system is provided in the present disclosure. The UAV temperature measurement device 2 includes the quad-rotor UAV 6, a temperature measurement module 7, a control chip 8, and the second positioning tag 9. The control chip 8 can accept the instruction from the control system to control the quad-rotor UAV 6 to move to a position under the operation area of the trolley-type leveler 1, and control the temperature measurement module 7 to measure the temperature in the operation area, and eventually the temperature parameters are outputted by the display screen 11 on the main control device 5. The second positioning tag 9 is arranged on the base of the quad-rotor UAV 6 and is configured to detect the position of the UAV temperature measurement device 2 to enable the UAV temperature measurement to reach the designated position. Since the temperature measurement module 7 is required to collect the energy emitted by the objects, the temperature measurement module 7 is installed above the quad-rotor UAV 6 to facilitate the measurement of the temperature in the leveling area. The quad-rotor UAV 6 is mainly configured to move the temperature measurement module 7 to reach the designated position. The control chip 8 can receive the control signal from the control system through the wireless local area network to control the operation states of the quad-rotor UAV 6 and the temperature measurement module 7, and can also transmit and interact data with the control system.

Since the UAV temperature measurement device 2 requires more position information and higher accuracy requirement, the three-dimensional positioning is adopted in the UAV temperature measurement device 2. When the positioning base station 3 is erected, the height difference in z-axis is especially required to increase to ensure the accuracy in z-axis. While the requirement of the position information for the trolley-type leveler 1 is relatively low, and the trolley-type leveler is already positioned well by the two-dimension positioning, therefore the two-dimensional positioning is adopted. Since the first positioning tag 4 is installed on the handle position of the trolley-type leveler 1, the control system is required to add the distance from the handle to the leveling area on the basis of the position parameters for the trolley-type leveler 1 to obtain the accurate position parameters for the leveling area to enable the temperature data measured by the UAV temperature measurement device 2 to be more accurate.

Figure 5:
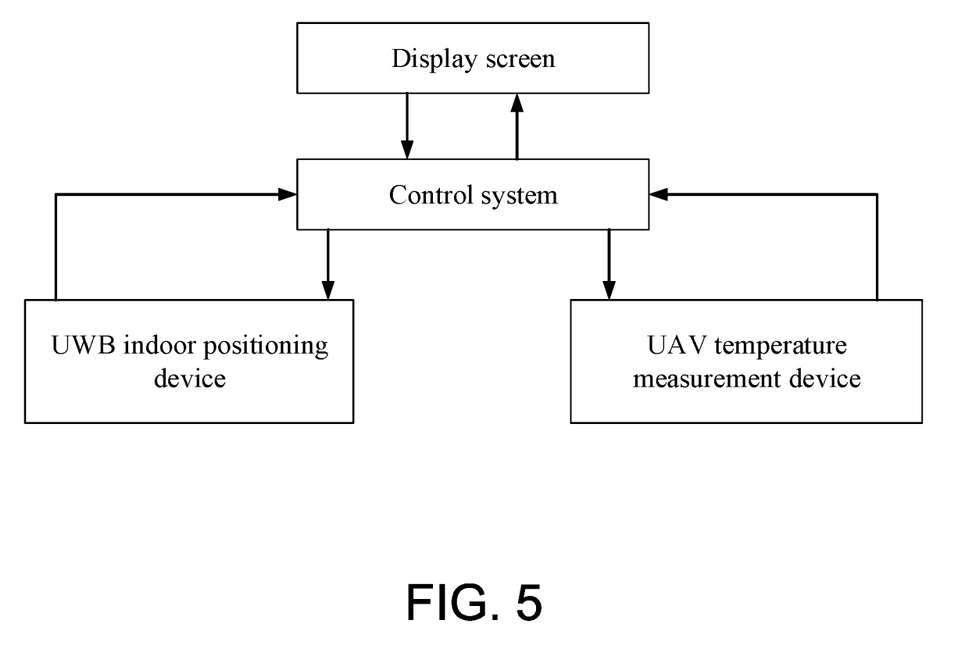
FIG. 5 illustrates a block diagram of a control system of the intelligent electromagnetic induction heating leveling system in the present disclosure.

As illustrated in FIG. 5, a block diagram of the control system for the intelligent electromagnetic induction heating leveling system is provided in the present disclosure. The control system includes a main control device 5 installed on the trolley-type leveler 1. A plurality of buttons 10 and a display screen 11 are arranged on the main control device 5. The leveling time and the leveling temperature can be intelligently controlled by the main control device 5, and the temperature of the leveling area is displayed through the display screen 11. Since the first positioning tag 4 is installed on the handle of the trolley-type leveler 1, which has a certain error with the position parameters for the leveling area, the control system is required to process the position parameters for the UAV temperature measurement device 2 and the trolley-type leveler 1. The position parameters for the trolley-type leveler 1 is converted into the position parameters for the leveling area, and the UAV temperature measurement device 2 is controlled by the control chip 8 to reach under the leveling area to measure the temperature of the leveling area, and the operation state of the UAV temperature measurement device 2 is also controlled by the control system, and the data are transmitted by the control system to the UAV temperature measurement device 2.

The operation process for the control system is as follows. The position parameters for the trolley-type leveler 1 are obtained through the first positioning tag 4, and the position parameters for the trolley-type leveler 1 are converted by the control system into the position parameters for the leveling area through the relevant calculation method, and then the UAV temperature measurement device 2 is controlled to move to a position under the leveling area. When the trolley-type leveler 1 is stated to operate, the position parameters for the leveling area are obtained by the control system through the UAV temperature measurement device 2, and the leveling temperature and the leveling time are intelligently controlled. When the trolley of the trolley-type leveler 1 is required to move, the function of the synchronous movement of the UAV temperature measurement device 1 and the leveling area is implemented by the control system.

Figure 4:
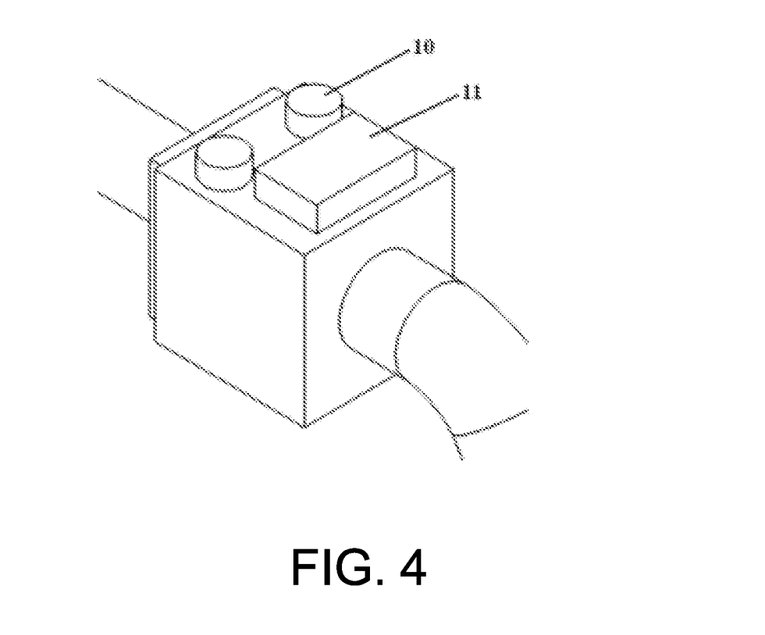
FIG. 4 illustrates a schematic diagram of a main control device of the intelligent electromagnetic induction heating leveling system in the present disclosure.

As illustrated in FIG. 4, the main control device 5 of the intelligent electromagnetic induction heating leveling system is provide in the present disclosure. The main control device 5 includes the buttons 10 and the display screen 11 which are mainly configured to set and display the relevant parameters and control the operation state of the trolley-type temperature measurement device 2.

By taking the trolley-type leveler 1 operating along the Y-axis direction as an example, it is assumed that the distance from the first positioning tag 4 on the trolley-type leveler 1 to the leveling area along the Y-axis direction is d mm, the temperature required for leveling area is T ° C., and the temperature required for the leveling area are required to be maintained for t seconds.

A method for leveling in the present disclosure includes the following step.

In Step 1, the positioning base stations 3 are arranged around the operation areas of the trolley of the trolley-type leveler 1 and UAV temperature measurement device 2, and the positioning tag 4 and the positioning tag 9 are arranged on the handle of the trolley-type leveler 1 and the base of the quad-rotor UAV 6 of the UAV temperature measurement device 2.

In Step 2, the trolley of the trolley-type leveler 1 is moved to the operation position.

In Step 3, the button 10 on the main control device 5 is pressed to activate the UWB indoor positioning device, and a signal sent by the first positioning tag 4 on the trolley-type leveler 1 is received by the positioning base stations 3 to convert the signal into the position parameters and transmit to the control system.

In Step 4, the distance of d mm from the handle to the leveling area is increased by the control system on the basis of the received position parameters, and converted into position parameters for the leveling area automatically, and the UAV temperature measurement device 2 is controlled to move to a position under the leveling area through the control chip 8.

In Step 5, the UAV temperature measurement device 2 is assisted by the control system to reach the designated position through the UWB indoor positioning device, and when the UAV temperature measurement device 2 is reached the designated position, the trolley-type leveler 1 being in the operation state is displayed on the display screen 11.

In Step 6, the trolley-type leveler 1 is started to operate, and at the same time, the temperature measurement module 7 of the UAV temperature measurement device 2 is started to measure the temperature in the leveling area, the temperature information of the detection area is sent to the leveling system through the control chip 8, and is displayed in real time through the display 11 on the main control device 5.

In Step 7, when the temperature in the detection area is reached the required temperature T ° C., the power of the trolley-type leveler 1 is automatically controlled by the control system, and the temperature in the leveling area is stabilized at T ° C., and maintained for t seconds.

In Step 8, the trolley-type leveler 1 is terminated for operation after t seconds, the UAV temperature measurement device 2 is maintained under the leveling area, and the temperature measurement module 7 on the UAV temperature measurement device 2 is closed.

In Step 9, since the trolley-type leveler 1 is currently required to be moved to another operation area in the actual operation, the synchronization button is pressed to automatically repeat Steps 3 to 8, thereby implementing the synchronous movement for the trolley-type leveler 1 and the UAV temperature measurement device 2.

In Step 10, when the leveling operation in the leveling area is completed, the button 10 is pressed to enable the UAV temperature measurement device 2 to fly back to the initial position.

What is claimed is:

1. An intelligent electromagnetic induction heating leveling system, comprising:
   a trolley leveler, including a main body of the trolley leveler; wherein a first positioning tag and a main control device are arranged on the trolley leveler; the first positioning tag is configured to measure position parameters for the trolley leveler, and the main control device is configured to control a moving position, an operation state and a data interaction of an unmanned aerial vehicle (UAV) temperature measurement device; and the first positioning tag is arranged on a handle of the trolley leveler;
   the UAV temperature measurement device, including a quad-rotor unmanned aerial vehicle (UAV), a temperature measurement module, a control chip, and a second positioning tag; wherein an instruction from a control system is accepted by the control chip to control the quad-rotor UAV to move to a position under an operation area of the trolley leveler, and to control the temperature measurement module to measure a temperature in the operation area, and the second positioning tag is configured to detect a position of the UAV temperature measurement device to enable the UAV temperature measurement device to reach a designated position;
   an indoor positioning device, wherein the indoor position device includes two sets of ultra wide band (UWB) indoor positioning devices, respectively including a positioning tag, positioning base stations, and the two sets of the UWB indoor positioning devices are respectively configured to convert position information of the trolley leveler and the UAV temperature measurement device into position parameters; the positioning base stations are arranged around operation areas of the trolley leveler and the UAV temperature measurement device, and cover signals in the operation areas, and are configured to detect the position information of the trolley leveler and the UAV temperature measurement device and upload the information to the control system for a summary analysis; and
   the control system, including the main control device installed on the trolley leveler, configured to intelligently control a leveling time and a leveling temperature in a leveling area, and display the leveling temperature in the leveling area through a display screen; to transmit data through a wireless local area network and the UAV temperature measurement device, and control the UAV temperature measurement device to move to the designated position, to complete a leveling operation efficiently; wherein a specific process of the control system includes that the UAV temperature measurement device is assisted by the control system to reach the designated position through one of the UWB indoor positioning devices, when the UAV temperature measurement device is reached the designated position, the trolley leveler is started to operate, and at the same time, the temperature measurement module of the UAV temperature measurement device is started to measure the leveling temperature in the leveling area, and temperature information in a detection area is sent to a leveling system through the control chip, when a temperature in the detection area is reached a required temperature, a power of the trolley leveler is automatically controlled by the control system, and the leveling temperature in the leveling area is stabilized at T ° C., and maintained for t seconds; the trolley-type leveler is stopped operating, so that an automatic temperature control function of the leveling system is implemented.

2. The intelligent electromagnetic induction heating leveling system according to claim 1, wherein the second positioning tag is arranged on a base of the quad-rotor UAV.

3. The intelligent electromagnetic induction heating leveling system according to claim 1, wherein a two-dimensional positioning is adopted in another one of the UWB indoor positioning devices applied to the trolley leveler, and at least four positioning base stations are arranged in the another one of the UWB indoor positioning devices, and the at least four position base stations are respectively installed in an edge area where the trolley leveler is operated.

4. The intelligent electromagnetic induction heating leveling system according to claim 1, wherein at least four positioning base stations are arranged in the one of the UWB indoor positioning devices applied to the UAV temperature measurement device, and the at least four positioning base stations are respectively installed in an edge area where the UAV temperature measurement device is operated.

5. An intelligent electromagnetic induction heating leveling method, adopting an intelligent electromagnetic induction heating leveling system including a trolley leveler, an unmanned aerial vehicle (UAV) temperature measurement device and a control system, wherein the intelligent electromagnetic induction heating leveling system is set as that the trolley leveler is set to move and operate along a Y-axis direction, a distance from a first positioning tag on the trolley leveler to a leveling area along the Y-axis direction is set to d mm, a temperature required in the leveling area is set at T ° C., and the temperature required in the leveling area is required to be maintained for t seconds;

the method includes following steps:

Step 1, arranging positioning base stations around operation areas of the trolley leveler and a UAV temperature measurement device, and placing the first positioning tag and a second positioning tag on a handle of the trolley leveler and a base of a quad-rotor unmanned aerial vehicle (UAV) of the UAV temperature measurement device respectively;

Step 2, moving the trolley leveler to an operation position;

Step 3, pressing a button on a main control device to activate an ultra wide band (UWB) indoor positioning device; receiving, by the positioning base stations, a signal sent by the first positioning tag on the trolley leveler to convert the signal into position parameters and transmit to the control system;

Step 4, increasing, by the control system, a distance of d mm from the handle to the leveling area based on the received position parameters to convert the distance of d mm into the position parameters for the leveling area automatically; and controlling, through a control chip, the UAV temperature measurement device to move to a position under the leveling area;

Step 5, assisting, by the control system, the UAV temperature measurement device to reach a designated position through a UWB indoor positioning device; and displaying, when the UAV temperature measurement device is reached the designated position, that the trolley leveler is in an operation state on a display screen;

Step 6, starting the trolley leveler for operation, and at a same time, measuring, by a temperature measurement module of the UAV temperature measurement device, a temperature in the leveling area; sending, through the control chip, temperature information in a detection area to a leveling system to display in real time through the display screen on the main control device;

Step 7, automatically controlling, by the control system, a power of the trolley leveler, when the temperature in the detection area is reached the required temperature T ° C., and stabilizing the temperature in the leveling area at T ° C. and maintaining for t seconds;

Step 8, terminating, after t seconds, the trolley leveler for operation; maintaining the UAV temperature measurement device under the leveling area, and closing the temperature measurement module of the UAV temperature measurement device;

Step 9, pressing, since the trolley leveler is currently required to be moved to another operation area in an actual operation, a synchronization button to automatically repeat Steps 3 to 8, thereby implementing a synchronous movement for the trolley leveler and the UAV temperature measurement device; and Step 10, pressing, when a leveling operation in the leveling area is completed, a button to enable the UAV temperature measurement device to fly back to an initial position.

* * * * *